Oct. 8, 1963  A. LEINS  3,106,381

TURBOMACHINE HOUSING

Filed April 26, 1961

INVENTOR.
ALFRED LEINS.
BY
K. A. Mayr
ATTORNEY.

3,106,381
TURBOMACHINE HOUSING
Alfred Leins, Esslingen (Neckar), Sulzgries, Germany, assignor to J. Eberspacher, Esslingen (Neckar), Germany, a firm of Germany
Filed Apr. 26, 1961, Ser. No. 105,810
7 Claims. (Cl. 253—55)

The present invention relates to housings for fluid flow engines operating at high temperatures, more particularly to housings of turbocompressors and exhaust gas turbosuperchargers.

The operating safety and the efficiency of turbomachines of the aforesaid type depends essentially on the control of the temperatures of the individual parts of the machines. In turbosuperchargers operated by hot exhaust gas there is a great difference between the temperature of the turbine and the temperature of the bearing for the turbine rotor and there is, therefore, a great heat flow from the turbine to the bearing. This causes not only a reduction of the power produced by the turbine, but also undesired heating of the fluid compressed by the compressor which increases the power required for compressing the fluid. Heating of the bearing impairs the operating safety of the unit and may result in the destruction of the bearing due to the heat expansion of parts of the bearing and excessive thinning of the lubricant.

It has been proposed to cool, for example, by a coolant the housing of the turbine and the bearing block. This is expensive and necessitates the provision of channels for the coolant in the turbine housing and/or the bearing block.

It is an object of the present invention to provide a connection between a cast metal part of the housing of a turbine and a cast metal part of a bearing block housing the bearing for the turbine rotor which connection substantially reduces heat flow between these parts. According to the invention a cast metal part of the turbine housing and a cast metal part of the bearing block are interconnected by elements made of a metal having a relatively low heat conductivity, for example steel. The effect is enhanced by making the connecting elements of relatively thin sheet metal which may be provided with heat-radiating ribs, or the like. The elements may be so shaped as to reduce sound effects and particularly vibrations producing noise. The sheet metal elements may be covered with sound-muffling substances.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
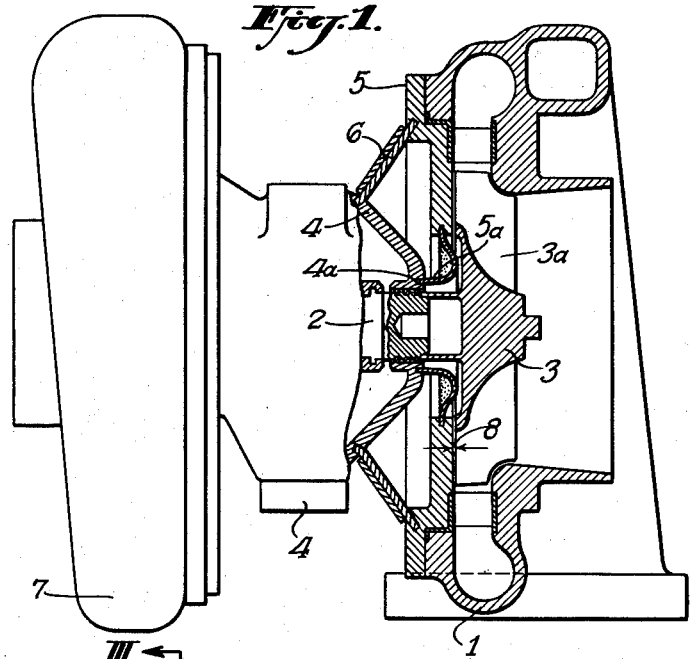
FIG. 1 is a part sectional elevation of an exhaust gas turbosupercharger including the structure according to the invention.

Referring more particularly to FIG. 1 of the drawing, numeral 1 designates the housing of a turbine comprising a rotor having a hub portion 3 mounted on the end of a shaft 2 rotating in a bearing in a bearing block 4. The shaft drives a compressor having a housing 7. The side of the turbine housing facing the bearing is closed by an annular wall 5. The central portion of this wall is formed by an annular sheet metal element 5a whose inner marginal portion is embedded at 4a in a part of the bearing block 4. The outer marginal portion of the element 5a is embedded in an outer annular part of the wall 5 which part is made of cast metal. The axial sectional configuration of the element 5a is curved to make it stiff and to muffle sound. To increase the sound-deadening effect a sound-proofing substance may be sprayed unto or otherwise connected to the element 5a. A suitable substance consists of glass fibres bound in synthetic resin. The cast metal outer part of the wall 5 is at least coextensive with edges of blades 3a of the turbine rotor which edges face the wall 5 so that the clearance 8 between said edges and the wall remains constant. The blades 3a form buckets which are open opposite the wall 5.

Figure 2:
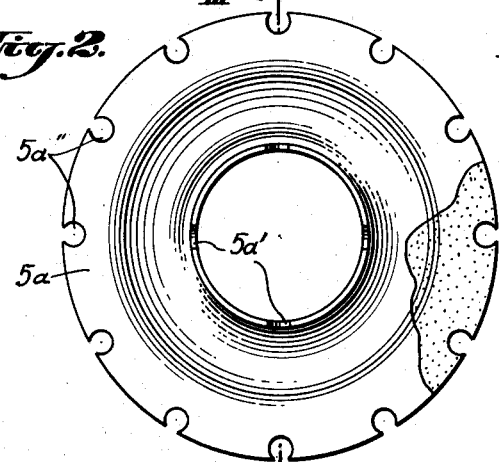
FIG. 2 is a plan view of a part of the supercharger shown in FIG. 1.
Figure 3:
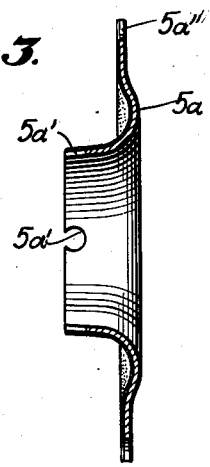
FIG. 3 is an axial sectional view of the part shown in FIG. 2, the section being made along line III—III of FG. 2.

As seen in FIGS. 2 and 3, the marginal portions of the element 5a are provided with recesses or bores 5a' and 5a" for improving the hold of the cast metal parts on the element 5a. Instead of recesses, ribs, or the like may be provided on the element 5a for improving the connection between the cast metal part of the wall 5 and the element 5a.

Figure 4:
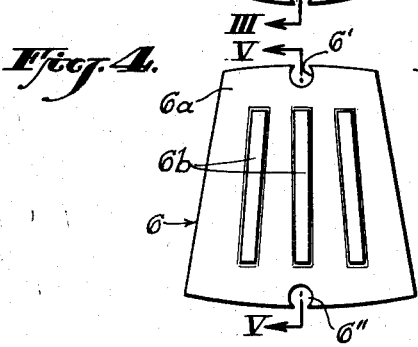
FIG. 4 is a plan view of a second part of the supercharger shown in FIG. 1.
Figure 5:
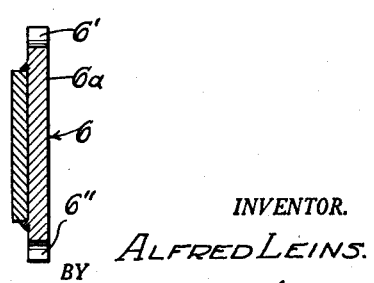
FIG. 5 is a longitudinal sectional view of the part shown in FIG. 4, the section being made along line V—V of FIG. 4.

The cast metal part of the wall 5 is connected to the bearing block 4 not only by the element 5a but also by means of stays 6, one of which is shown in FIGS. 4 and 5. Each stay comprises a sheet metal part 6a provided with apertures 6' and 6" for anchoring the stay in the metal castings 4 and 5. The stays may be provided with ribs 6b welded to the plate 6a for cooling the stay and for reducing vibration of the stay and noise caused thereby. The reenforced stays impair transmission of vibrations from the turbine to the compressor.

The stays 6 and the element 5a reduce heat transfer from the turbine to the compressor, because they are made of steel and have cross sections which are considerably smaller than the cross sections of the cast metal parts to which they are connected. The new structure interrupts heat flow from the turbine casing 1 through the bearing block 4 to the compressor casing 7 more effectively than conventional complicated cooling systems. The bearing supported in the block 4 is protected against excessive heating and the fluid in the casing 7 is not heated by heat coming from the turbine casing 1.

I claim:
1. In a radial turbine operated by a high-temperature operating medium, a rotor having a hub portion and turbine blades extending therefrom and having edge portions placed in a plane extending radially from said hub portion, said blades forming buckets which are open at said edge portions, a turbine casing, said casing including a cast annular wall member placed coaxially of said rotor and having an inner marginal portion adjacent to said hub portion, said annular member having a radial surface in close vicinity of said edge portions of said blades for substantially preventing flow of operating medium from said buckets between said edge portions, a shaft coaxially extending from said hub portion outside of said casing, a bearing for said shaft, a cast housing for said bearing, and an annular sheet metal element interposed between said inner portion of said cast annular member and said bearing housing, said annular sheet metal element having an outside exposed to the ambient air and having an outer annular edge cast into said annular member and having an inner annular edge cast into said bearing housing to reduce heat conduction from said annular member to said bearing housing.

2. In a turbine as defined in claim 1 and wherein said annular sheet metal element has an angular cross section and has a substantially radial portion forming a radial inward extension of said cast annular member, said annular sheet metal element having a substantially tubular portion whose outside is exposed to the ambient air and whose end is cast into said bearing housing, said tubular portion sleevelike surrounding said shaft.

3. In a turbine as defined in claim 1 additional sheet metal elements interconnecting said annular member and said bearing housing, each of said additional elements having an edge cast into said member and an edge cast into said bearing housing, said additional elements being disposed outside of the turbine and exposed to the ambient air for cooling thereby.

4. In a turbine according to claim 3 and wherein said edges of said sheet metal elements are provided with anchoring means improving the hold of said edges in said cast annular member and in said cast bearing housing.

5. In a turbine as defined in claim 1 and wherein said annular edges of said annular sheet metal element are provided with anchoring means improving the hold of said edges in said cast annular member and in said cast bearing housing.

6. In a turbine according to claim 3 and wherein said additional sheet metal elements are provided with cooling ribs.

7. In a turbine according to claim 3 and wherein said sheet metal elements are provided with sound-deadening means.

References Cited in the file of this patent

UNITED STATES PATENTS

| | | |
|---|---|---|
| 1,664,114 | Kelley | Mar. 27, 1928 |
| 1,973,124 | Swan et al. | Sept. 11, 1934 |
| 2,265,770 | Crawford | Dec. 9, 1941 |
| 2,484,275 | Eastman | Oct. 11, 1949 |
| 2,646,210 | Kohlmann et al. | July 21, 1953 |
| 2,918,207 | Moore | Dec. 22, 1959 |
| 2,938,659 | Judson et al. | May 31, 1960 |
| 2,973,136 | Greenwald | Feb. 28, 1961 |

FOREIGN PATENTS

| | | |
|---|---|---|
| 988,631 | France | May 9, 1951 |
| 1,218,301 | France | Dec. 14, 1959 |